J. BURKE.
Seed-Sower.

No. 165,406.  Patented July 13, 1875.

WITNESSES:
P. C. Dieterich
U. Gardner

INVENTOR:
John Burke
per C. H. Watson
Ass'o ATTORNEY.

N. PETERS, PHOTO-LITHOGRAPHER, WASHINGTON, D. C.

UNITED STATES PATENT OFFICE.

JOHN BURKE, OF SYCAMORE, ILLINOIS.

IMPROVEMENT IN SEED-SOWERS.

Specification forming part of Letters Patent No. 165,406, dated July 13, 1875; application filed April 19, 1875.

*To all whom it may concern:*

Be it known that I, JOHN BURKE, of Sycamore, in the county of De Kalb and State of Illinois, have invented new and useful Improvements in Seed-Sowers, of which the following is a full description, reference being had to the accompanying drawings.

Figure 1:
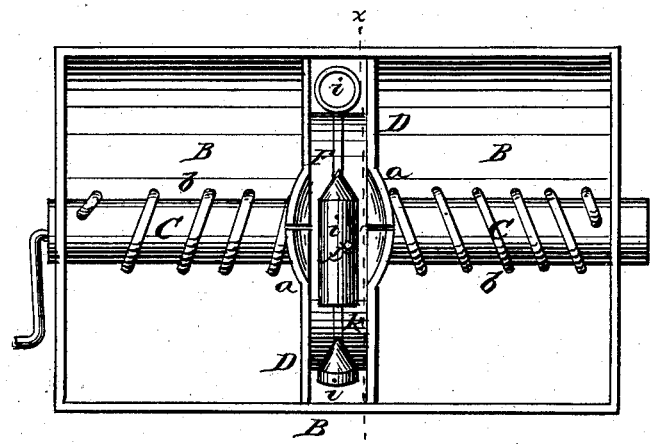
Figure 2:
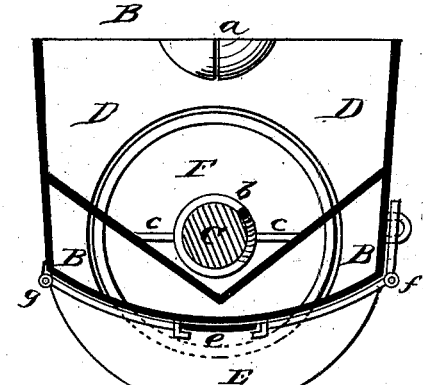
Figure 3:
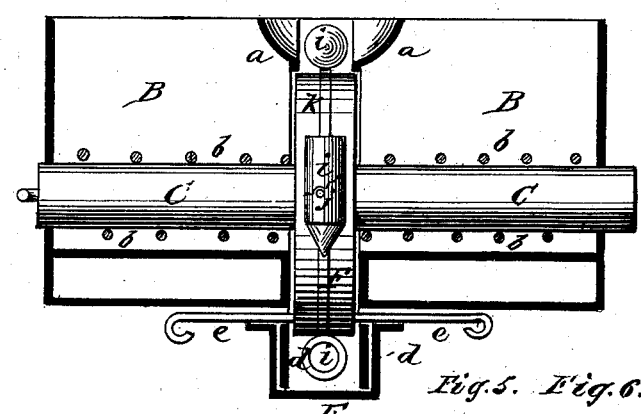
Figure 4:
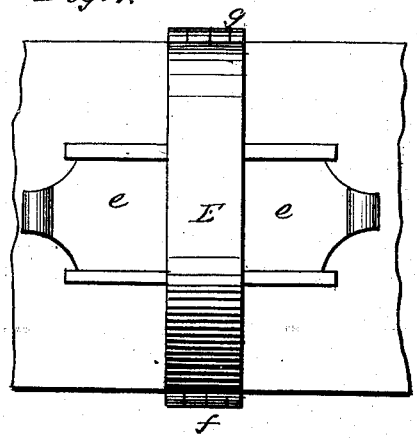
Figures 5, 6:
Figure 7:
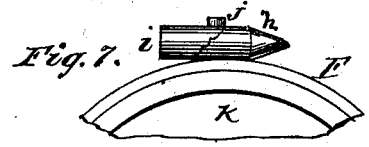

Figure 1 is a top or plan view; Fig. 2, a cross-section on line $x$ $x$ of Fig. 1; Fig. 3, a vertical longitudinal section; Fig. 4, a bottom view; Figs. 5, 6, and 7, details enlarged; and Fig. 8, a view of a section of the shaft, showing the worm arranged to feed in opposite directions.

The improvements herein described are improvements upon my machine patented to me October 6, 1874; and their nature consists in certain improvements in feeding or carrying the grain or seed to the feed-wheel, in regulating the quantity of grain or seed admitted to the lower receptacle, and preventing waste of seed, as hereinafter more fully set forth.

In the drawings, A represents the grain-box; B, the inclined false bottom; C, the shaft for operating the feed-wheels; D D, wings for keeping the grain from the feed-wheels; E, the receptacle; F, a feed-wheel; $a$, turned corners of the wings D; $b$, scroll or worm on the shaft C; $c$, bridge-bearing for the main shaft; D, wings or extension-plates on the bottom of the grain-box, extending nearly or quite to the bottom of the receptacle E; $e$, regulators or cut-off slides; $f$, latch or catch; and $g$, hinge of the receptacle E; $h$, center core of the seed-cup; $i$, elastic or spring tube forming the sides of the seed-cup; $j$, stud or pin for preventing the tube $i$ from slipping backward on the core $h$; $k$, center plate or disk of the feed-wheel; and $l$, a fin on the periphery of the feed-wheel, to which the seed-cups are attached.

Figure 8:

The grain-box A is shown with only one feed-wheel, but, in constructing a machine for use, it will be extended so as to take in a number of feed-wheels, the number of which will depend upon the width of the machine; and in dividing the grain-box into sections, the scroll or worm of the main shaft is made to reverse from the middle, as shown at Fig. 8, so as to carry the grain toward each wheel F. The feed-wheel runs in a narrow compartment, which is made by fitting the wings D against the periphery of the wheel. The inner upper corners of these wings are bent out at $a$ so as to give room for the hand to set or adjust the seed-cups without diminishing the capacity of the grain-box, as it would if the wings were cut away at this point to give access to the seed-cups. The remaining part of the division between the sections of the grain box or boxes is formed by the wheel, which wheel is made with a broad outer band or periphery, as shown, and a single center piece or disk, $k$.

The grain comes in contact with the wheel and passes down between the ends of the false bottom B and the disk $k$, which disk extends below the bottom of the box A, as shown at Fig. 2. This opening is arranged, as to its capacity, so as to be suitable for the different kinds of grain; but it will be found too capacious for seeds. I have provided valves or slides $e$ on the bottom, which can be slid in so as to nearly close the space between the bottom and disk $k$, and check the flow into the receptacle E, and diminish the pressure therein; and in hinging the receptacle it was found that grass-seeds were liable to be crowded out over its top. As a further provision against such overflow or leakage I have provided the bottom with wings or flanges $d$ $d$, which fit against the inner sides of the receptacle E and extend downward so as to nearly or quite fit against its bottom, as shown at Fig. 3. The receptacle E, with the wings D, forms a kind of tube around the feed-wheel, through which the seed-cups pass. The grain or seed taken up by the cups is thrown out through an opening in the rear, similar to that shown in my previous patent, and a distributor may be used with it or not, as may be desired.

The seed-cups are made by attaching the cores $h$ to a fin, $l$, or, by other suitable means, to the periphery of the wheel F. A shell, $i$, is made to fit over this core, which has its rear end provided with steps to rest against the pin $j$, so that, by turning it so as to bring different steps in contact with the pin, the depth of the cup is increased or diminished so as to adjust the cups to the desired quantity and to the different kinds of the grains or seeds. The shells $i$ are made of springy or elastic material, and slightly smaller on their interior diameter than the cores $h$, so that when they are sprung into place they will remain, without slipping from one step to another and without changing their capacity by any accidental movement.

In operation the shaft C is made to revolve by any suitable gearing connecting it with the traveling-wheels or axles. The box A is filled with grain, and, as the shaft C revolves, it passes down, by the side of the disk $k$ of the feed-wheel, into the receptacle below, from which it is taken by the cups and delivered out at the rear in regular and measured quantities.

What I claim as new, and desire to secure by Letters Patent, is as follows:

1. In a seed-planter, the partition-wings D, with the corners turned at $a$ so as to form an opening to give access to the seed-cups, substantially as specified.

2. The springing or elastic shell $i$ of the seed-cup, substantially as and for the purposes described.

3. The combination of the springing shell $i$, having steps at its rear end, with the core $h$ and stop $j$, substantially as and for the purposes set forth.

4. In a seed-planter, the partition-wings D, with turned corners to form an opening for the cups, in combination with the flanged feed-wheel F $k$ and cups $i$, substantially as and for the purpose set forth.

JOHN BURKE.

Witnesses:
L. L. BOND,
O. W. BOND.